(12) United States Patent
Popkin et al.

(10) Patent No.: US 8,398,048 B2
(45) Date of Patent: Mar. 19, 2013

(54) STRUCTURE FOR MOUNTING AN OBJECT ON A VERTICAL SURFACE AND METHOD OF MAKING SAME

(75) Inventors: Jeffrey Popkin, Weston, FL (US); Edson Mejia, Miami, FL (US); David Weck, Miami, FL (US); Steven C. Berenson, Miami, FL (US)

(73) Assignee: The Hillman Group, Inc., Cincinnati, OH (US)

( * ) Notice: Subject to any disclaimer, the term of this patent is extended or adjusted under 35 U.S.C. 154(b) by 737 days.

(21) Appl. No.: 12/246,703

(22) Filed: Oct. 7, 2008

(65) Prior Publication Data

US 2010/0084539 A1 Apr. 8, 2010

(51) Int. Cl.
*F16M 13/00* (2006.01)

(52) U.S. Cl. ............. 248/547; 248/475.1; 248/497

(58) Field of Classification Search ............ 248/547, 248/466, 467, 475.1, 477, 489, 497
See application file for complete search history.

(56) References Cited

U.S. PATENT DOCUMENTS

| | | | | |
|---|---|---|---|---|
| 3,926,399 A | * | 12/1975 | Tendler | 248/467 |
| 4,039,138 A | * | 8/1977 | Einhorn | 248/497 |
| 4,094,490 A | * | 6/1978 | Einhorn | 248/489 |
| 4,309,016 A | * | 1/1982 | Tendler | 248/467 |
| 5,437,429 A | * | 8/1995 | Atlas | 248/493 |
| 5,605,313 A | * | 2/1997 | Erickson et al. | 248/467 |
| 6,206,334 B1 | | 3/2001 | Weck et al. | |
| 6,651,945 B2 | * | 11/2003 | Rivellino et al. | 248/206.5 |
| 7,802,769 B1 | * | 9/2010 | Lindsey | 248/489 |
| 2006/0113454 A1 | * | 6/2006 | Douglas | 248/477 |
| 2010/0294910 A1 | * | 11/2010 | Grant Orsini et al. | 248/475.1 |

* cited by examiner

*Primary Examiner* — Bradley Duckworth
(74) *Attorney, Agent, or Firm* — Lowe, Hauptman, Ham & Berner, LLP

(57) ABSTRACT

A picture hanger has a base portion having a hole for an elongated fastener (nail or screw). The base portion carries a member enclosing a front face or the entire base portion. The member has a through hole aligned with and on one or both sides of the fastener hole. The elongated fastener is held in place in the holes so that the fastener need not be manually held during driving thereof into a picture frame or wall. The member is injection molded on the base portion, and consists essentially of nylon-6,6 having a Shore A hardness in the range of 80-90.

24 Claims, 9 Drawing Sheets

STRUCTURE FOR MOUNTING AN OBJECT ON A VERTICAL SURFACE AND METHOD OF MAKING SAME

FIELD OF INVENTION

The present invention relates generally to structures for mounting objects on a vertical surface, and more particularly to such a structure having a base with a fastener hole for receiving an elongated fastener in a portion thereof, wherein (1) the base carries a member enclosing all or part of the base portion having the fastener hole, (2) the member includes a through hole aligned with the fastener hole, and (3) an elongated fastener is held in place in the fastener hole and the through hole so that the fastener need not be manually held during driving thereof into the object. The present invention also relates to a method of making such a structure wherein the member is injection molded about the base portion.

BACKGROUND ART

One type of structure for mounting objects on a vertical surface, such as a wall, is referred to as a picture hanger, although such structures are used to hang objects other than pictures, such as mirrors and diplomas. The term "picture hanger" as used in this document refers to such a structure, and is not to be limited to structures for hanging only pictures. There are two types of picture hangers: (1) those that are attached to the object to be mounted on a nail or other type of fastener attached to the vertical surface, and (2) those that are attached to the vertical surface and receive a wire or the like carried by the object.

For many picture hanger installers, mounting a picture hanger is a difficult task because of the necessity to hold the hanger and the fastener, such as a nail or screw, in one hand while using the other hand to hold and use a tool, such as a hammer or screwdriver, to force the fastener into the object to be mounted on the vertical surface through a hole in the picture hanger of type (1), or to force the fastener into the vertical surface through a hole in the picture hanger of type (2). If the fastener is a small nail or brad, such as an 18 gauge nail (a nail having a shaft length of ½", a head diameter of 0.112 inch, and a shaft diameter of 0.055 inch), the problem is compounded by difficulties in holding the nail, while trying to avoid hitting the fingers holding the nail in place.

We are aware of prior art disclosing structures for holding fasteners in place on picture hangers during installation of the picture hangers. For example, Weck et al, U.S. Pat. No. 6,206,334, discloses a rubber or foam backing layer on the base of a picture hanger. The backing layer is disclosed as having a thickness between 1/16 and 1/8 of an inch. The foregoing characteristics enable the backing layer to hold a fastener in place after the fastener has been impaled in the backing layer so that an installer of the picture hanger need not hold the fastener while the fastener is being hammered in place.

The structure described in the Weck et al. patent functions admirably for relatively large fasteners but in certain instances does not adequately hold small fasteners, such as 18 gauge nails, in place. In addition, the rubber or foam backing layer has a tendency to lose its holding power, even for larger fasteners, if not used within about 24 months of initial installation on the hanger. In other words, the rubber or foam backing described in the Weck et al. patent does not have an indefinite shelf life.

It is, accordingly, an object of the present invention is to provide a new and improved picture hanger that can be attached in place without holding an attaching fastener, and to a method of making same.

Another object of the present invention is to provide a new and improved picture hanger including a member that holds a fastener of the picture hanger in place while the hanger is being installed on an object, such as a picture frame or wall, so that an installer of the picture hanger need not hold the fastener during the installation, and to a method of making same.

A further object of the present invention is to provide a new and improved picture hanger including a member that holds small fasteners, such as 18 gauge nails, in place while the picture hanger is being installed, and to a method of making same.

An additional object of the present invention is to provide a new and improved picture hanger including a member that holds fasteners in place while the picture hanger is being installed, wherein the member has a long shelf life, and to a method of making same.

SUMMARY OF THE INVENTION

In accordance with one aspect of the present invention, a picture hanger for mounting an object on a vertical surface comprises a base having (a) a front face adapted to face away from the object, (b) a rear face opposite from the front face adapted to face toward the object, and (c) a portion with a fastener hole between the front and rear faces for receiving an elongated fastener. The base portion carries a member enclosing the front face. The member includes a through hole aligned with the fastener hole. An elongated fastener is held in place in the fastener hole and the through hole in such a manner that the fastener need not be manually held while a tool held by an installer is applying driving force to the fastener to cause the fastener to be driven in the holes and into the object.

In the preferred embodiments, the fastener is either a nail or a screw. The member preferably has a hardness and flexibility such that the member does not crack in response to either (1) the nail being struck by a hammer applying driving force to hammer the nail into the object while the nail is in the fastener hole and the through hole, or (2) the screw being turned by a screwdriver applying driving force to screw the nail into the object while the screw is in the fastener hole and the through hole.

The member preferably consists essentially of nylon-6,6, a semicrystalline polyamide having a glass transition temperature of about 50° C., a melting temperature of about 255° C. a molecular weight of about 226 g per mole, and the chemical composition $C_{12}H_{22}O_2N_2$. The member preferably has a Shore A hardness in the range of 80-90 and is formed by injection molding in situ on the base portion either while the fastener is in the fastener hole or prior to the fastener being in the fastener hole.

The foregoing physical and chemical characteristics of the member, in combination with the injection molding process, enable (1) the through hole wall diameter and the fastener shaft diameter to be virtually equal, and (2) the member to be flexible and have physical memory properties so the member can expand and contract under the pressure associated with hammering or screwing a fastener (such as an 18 gauge nail or a sheet metal screw) into an object, such as a picture hanger, or into a vertical surface, such as a wall. As a result, the member securely holds the fastener in place while the fastener is being driven either into a picture frame or a wall. These physical and chemical characteristics of the member also enable the member to have what is believed to be a virtually indefinite shelf life.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

DETAILED DESCRIPTION OF THE DRAWINGS

Reference is now made to FIGS. 1-11 wherein picture hanger 10 is illustrated as having an elongated, metal, preferably brass coated stamped, 19 gauge (0.0400" thickness) steel, body 12. Body 12 includes center portion 13 that is between opposite end portions 14 and 16 which respectively carry end cap members 40 and 42, preferably made of plastic. Body 12 has a uniform thickness between a pair of parallel faces.

One edge of center portion 13 of elongated body 12 includes alternate V-shaped ridges 18 and V-shaped troughs 20 forming a sawtooth structure, while the other, opposite edge of the center portion of elongated body 12 includes alternate flat ridges 22 and flat depressions 24. The ridges, troughs and depressions are shaped so that, while picture hanger 10 is secured to picture frame 25 (FIG. 11), the troughs or depressions can rest on and be supported by a fastener, such as a nail or screw, secured to a wall.

To facilitate mounting picture hanger 10 on frame 25, the center of the picture hanger, between end portions 14 and 16, can easily be located by an installer by virtue of dimples 26 on the two V-shaped ridges 18.1 and 18.2 between center V-shaped trough 20.1.

Elongated, groove shaped strengthening rib 27 extends longitudinally of body 12, from the V-shaped ridge 18.3 closest to end portion 14 to the V-shaped ridge 18.4 closest to end portion 16, and between the opposite edges of the elongated body.

The top faces of opposite end portions 14 and 16 of elongated body 12 are in a plane displaced from the plane of the top face of center portion 13 by virtue of bent portions 31 and 33 of body 12, to provide a standoff between frame 25 and center portion 13.

Opposite end edges 28 and 30 of end portions 14 and 16 are arcuately shaped so that edges 28 and 30 are sectors of circles having equal relatively large diameters compared to the distance between end edges 28 and 30. End edges 28 and 30 are convex with respect to the elongated direction of body 12.

End portions 14 and 16 of elongated body 12 respectively include fastener holes 32 and 34 for receiving the shafts 37 of nails 36 and 38, each of which also includes rounded head 39 and pointed end 41; holes 32 and 34 are referred to hereinafter as nailholes. Nailholes 32 and 34 have equal diameter circular walls throughout the lengths thereof; the circular walls have the same diameter which is slightly greater than the equal diameters of the circular shafts 37 of nails 36 and 38. Nailholes 32 and 34 are equidistant between the opposite edges of elongated body 12 and are equidistant from end edges 28 and 30.

End cap members 40 and 42 (1) respectively enclose end portions 14 and 16 of elongated body 12, and (2) have the same configuration, being shaped as discs having parallel bottom and top faces 55 and 57 that are in planes parallel to the bottom and top faces 54 and 56 of end portions 14 and 16. The peripheral edge of each end cap member 40 and 42 includes sector 44 of a circle having an arcuate extent of about 270°. The ends of sector 44 are connected by a flat face 46 which extends in a direction at right angles to the longitudinal axis of elongated body 12 and is close to bent portions 31 and 33.

Each of end cap members 40 and 42 includes a slot 48 (FIGS. 5 and 9) having (1) a rectangular opening in flat face 46 and (2) interior surfaces having the same shape and size as the shape and size of the exterior surfaces of end portions 14 and 16 that are enclosed by the end cap members. Slot 48 has a lower flat face 50 and an upper flat face 52, both of which are in planes parallel to the exterior parallel lower and upper flat faces 54 and 56 of end portions 14 and 16. To enable hanger 10 to be as close as possible to picture frame 10 and thereby minimize the standoff between the back of the picture frame and the wall on which it is mounted, lower interior flat face 50 of slot 48 is closer to exterior lower flat face 55 than upper interior flat face 52 is to exterior upper flat face 57; a typical spacing between faces 50 and 55 is 0.010". The spacing between lower and upper interior flat faces 50 and 52 of slot 48 is the same as the spacing between exterior lower flat face 54 and exterior upper flat face 56 of end portions 14 and 16.

Figure 11:
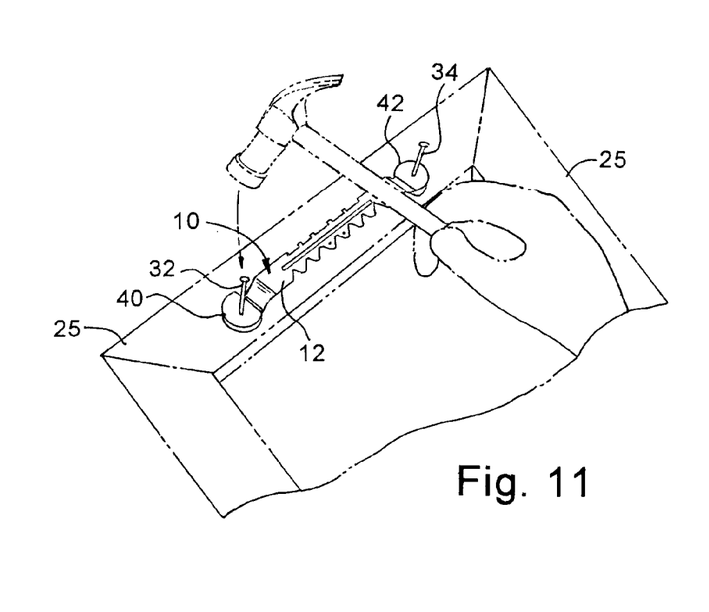
FIG. 11 is a perspective view of an installer hammering a nail carried by a member on the picture hanger of FIG. 1 into a picture frame.
Figure 12:
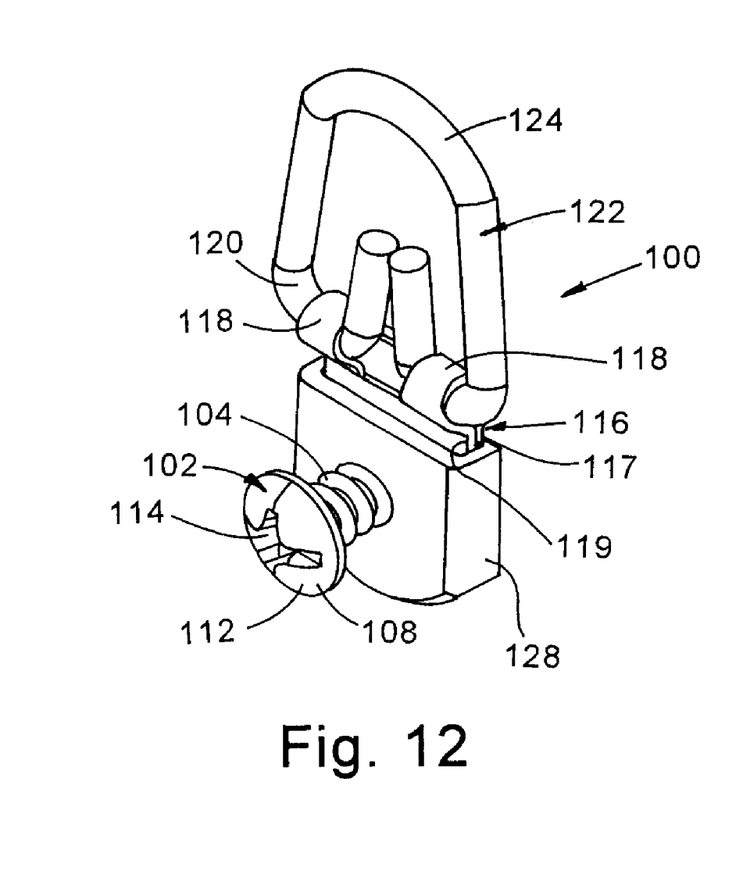
FIG. 12 is a top perspective view of small D ring hanger of the type adapted to be secured by one screw to a picture frame in accordance with a second preferred embodiment of the invention.
Figure 13:
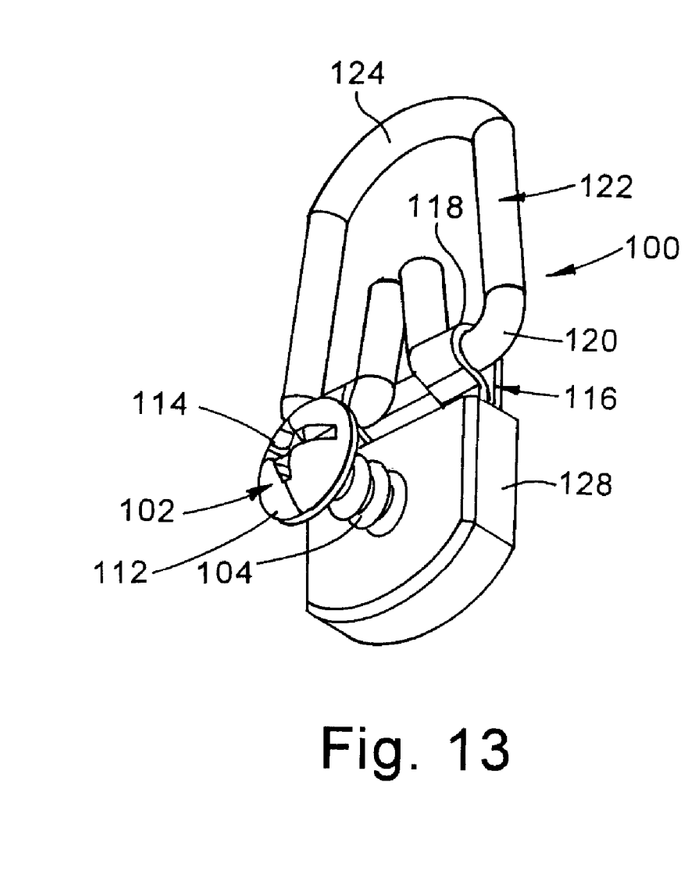
FIG. 13 is a bottom perspective view of the hanger illustrated in FIG. 12.
Figures 14, 15, 16:
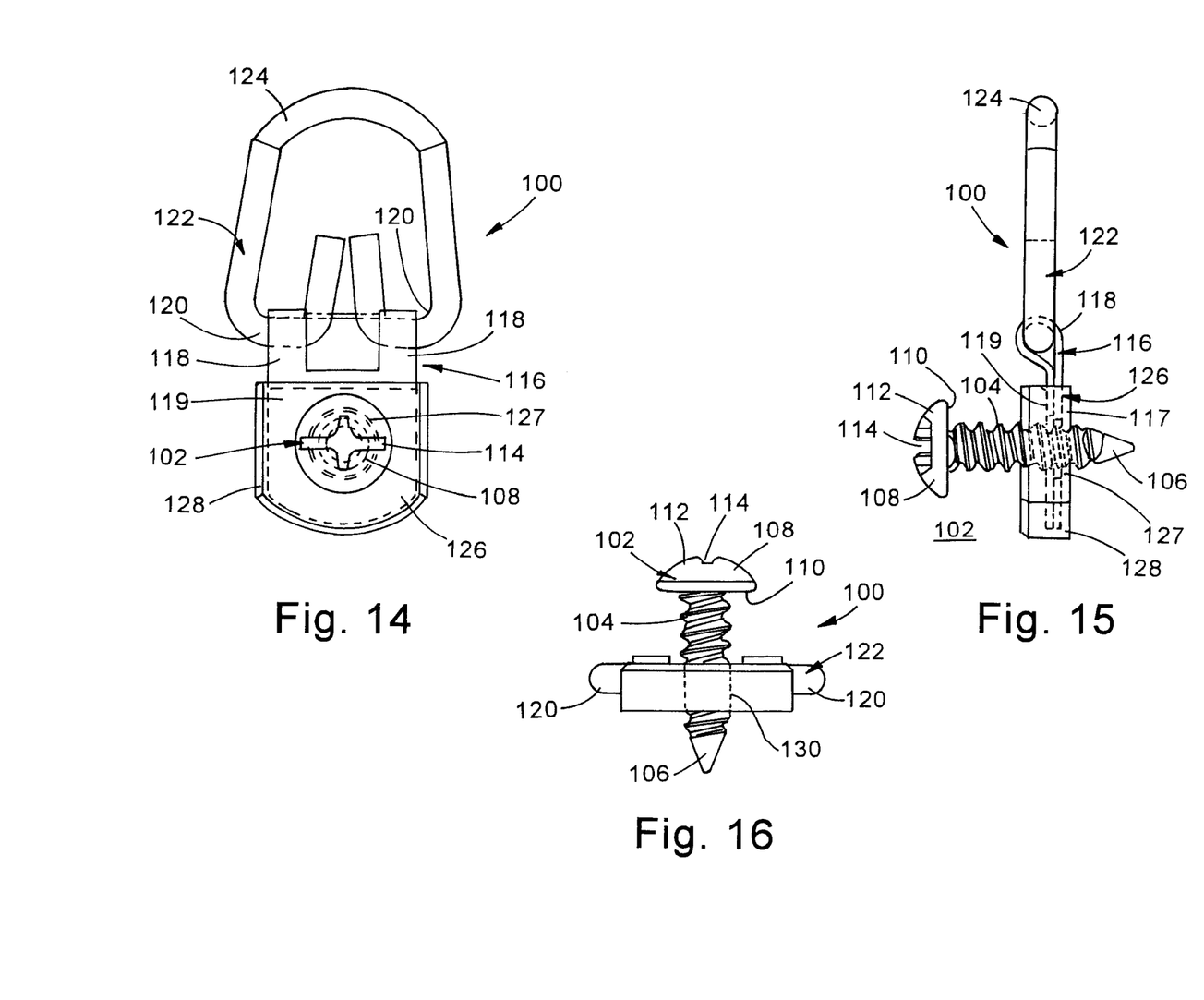
FIG. 14 is a front view of the hanger illustrated in FIG. 12.
FIG. 15 is a side view of the hanger illustrated in FIG. 12.
FIG. 16 is a bottom view of the hanger illustrated in FIG. 12.
Figure 17:
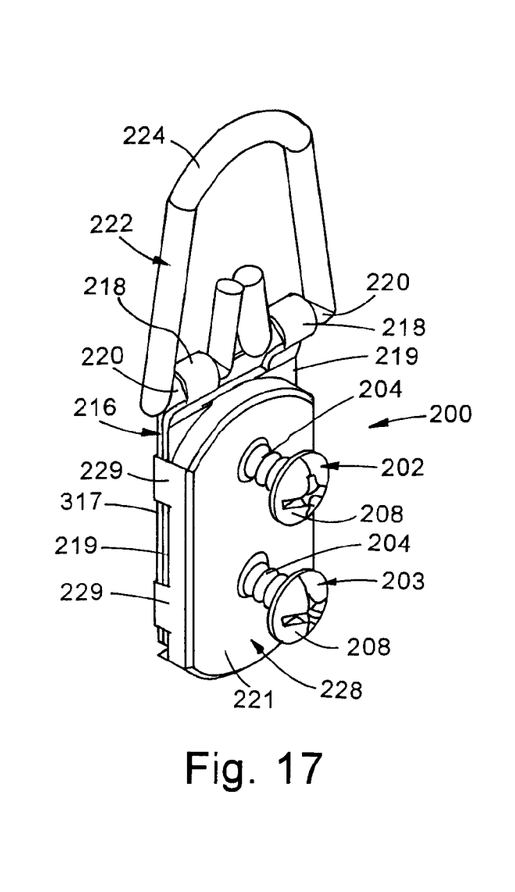
FIG. 17 is a front perspective view of a large D ring hanger of the type adapted to be secured by two screws to a picture frame in accordance with a third preferred embodiment of the invention.
Figure 18:
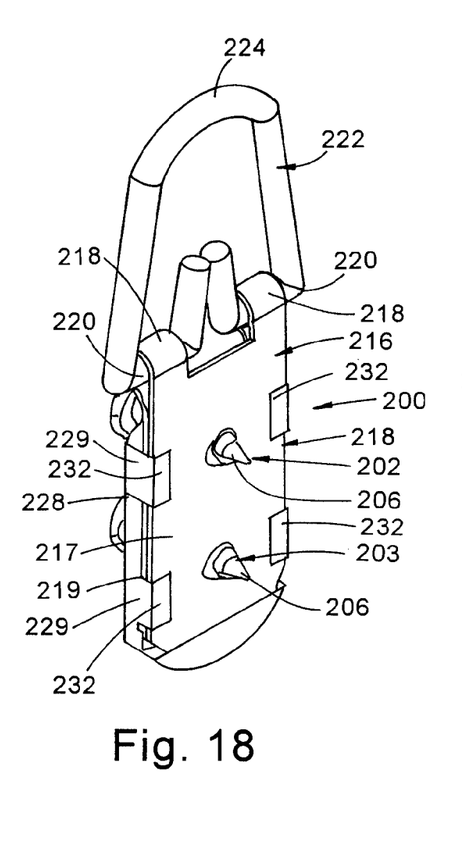
FIG. 18 is a back perspective view of the hanger illustrated in FIG. 17.
Figure 19:
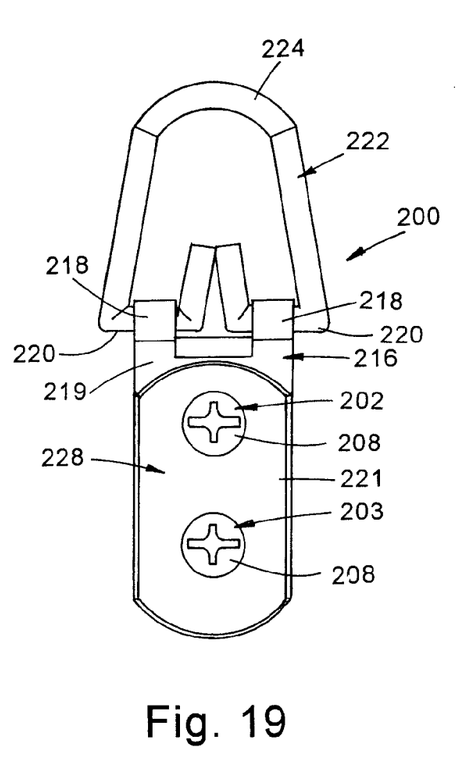
FIG. 19 is a front view of the hanger illustrated in FIG. 17.
Figure 20:
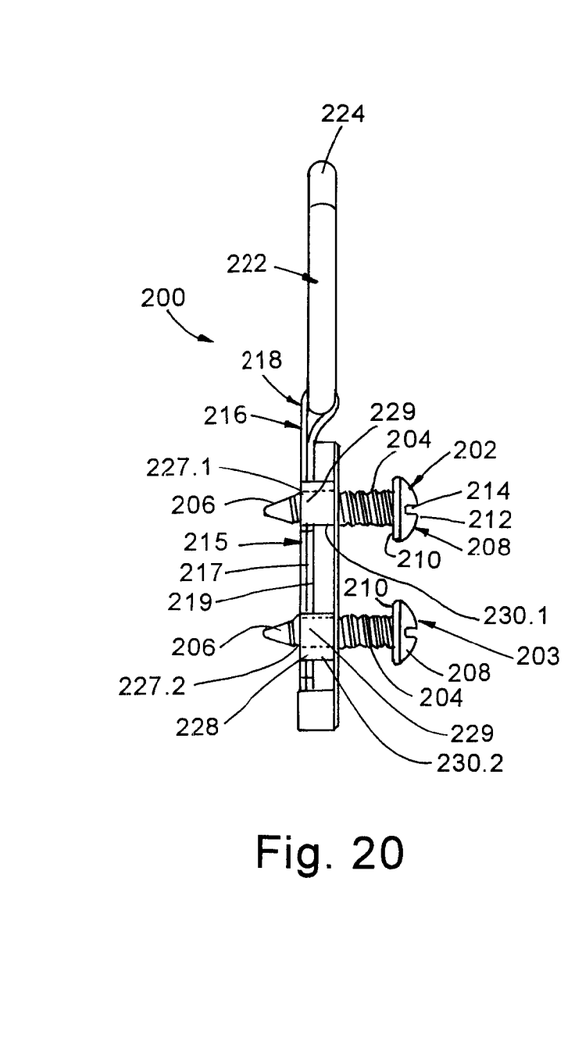
FIG. 20 is a side view of the hanger illustrated in FIG. 17.
Figures 21, 22:
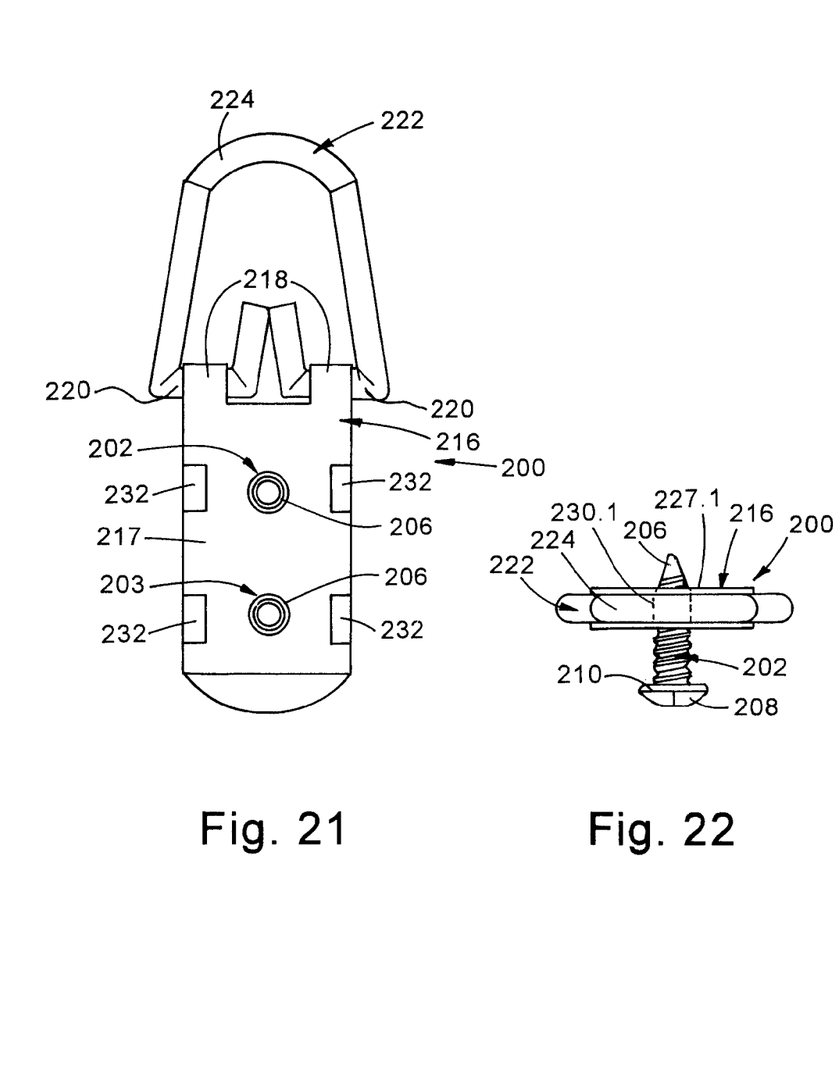
FIG. 21 is in a back view of the hanger illustrated in FIG. 17.
FIG. 22 is a top view of the hanger illustrated in FIG. 17.
Figures 23, 24, 25, 26, 27, 28:
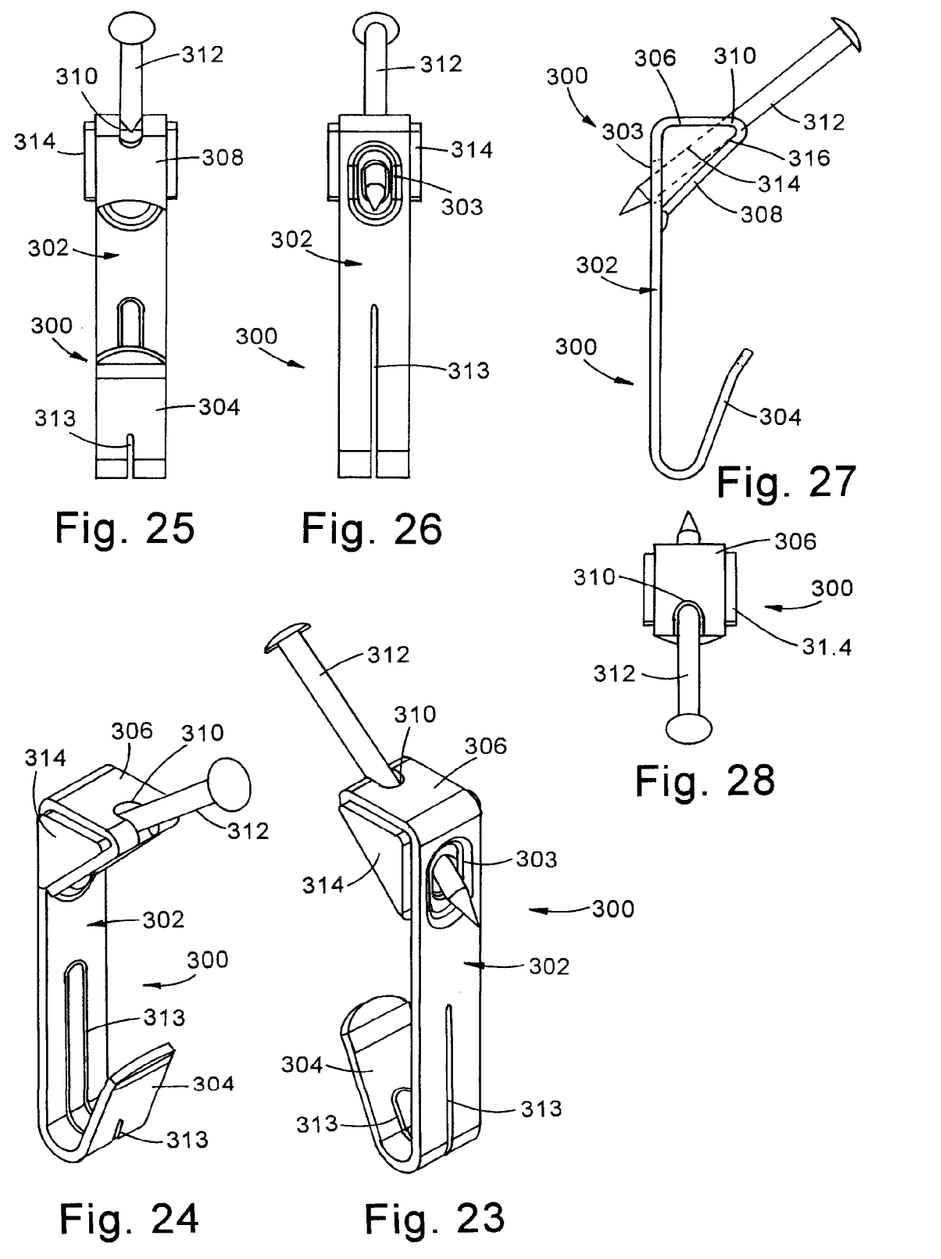
FIG. 23 is a back perspective view of a hanger adapted to the secured to a wall by one nail and to carry a wire mounted on a picture frame in accordance with a fourth preferred embodiment of the invention.
FIG. 24 is a front perspective view of the hanger illustrated in FIG. 23.
FIG. 25 is a front view of the hanger illustrated in FIG. 23.
FIG. 26 is a back view of the hanger illustrated in FIG. 23.
FIG. 27 is a side view of the hanger illustrated in FIG. 23.
FIG. 28 is a top view of the hanger illustrated in FIG. 23.
Figures 29, 30, 34:
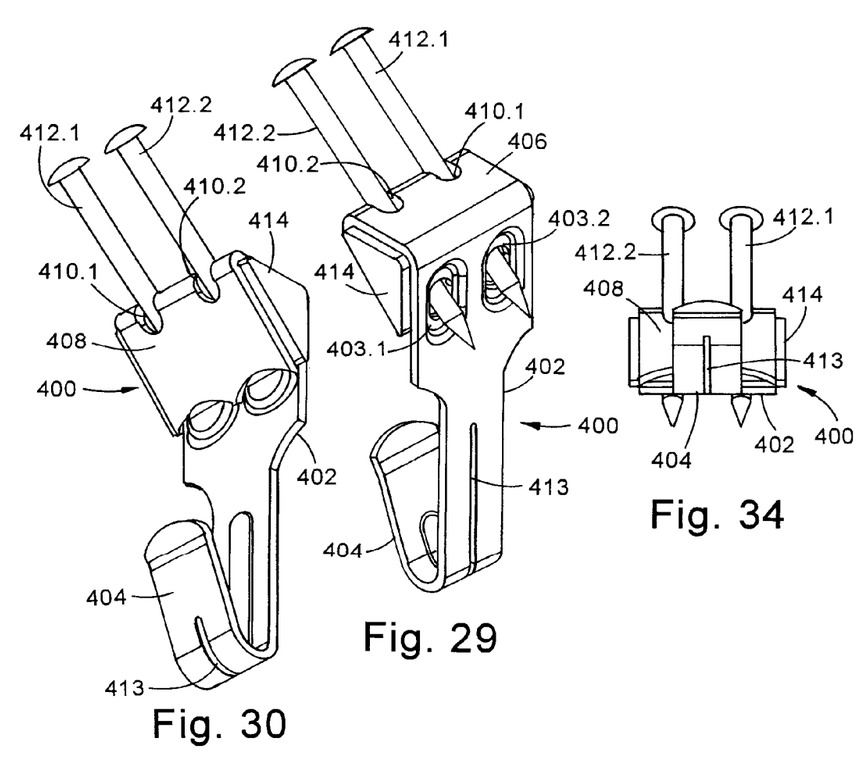
FIG. 29 is a back perspective view of a hanger adapted to be secured by two nails to a wall and to carry a wire mounted on a picture frame in accordance with a fifth preferred embodiment of the invention.
FIG. 30 is a front perspective view of the hanger illustrated in FIG. 29.
FIG. 34 is a bottom view of the hanger illustrated in FIG. 29.
Figure 31:
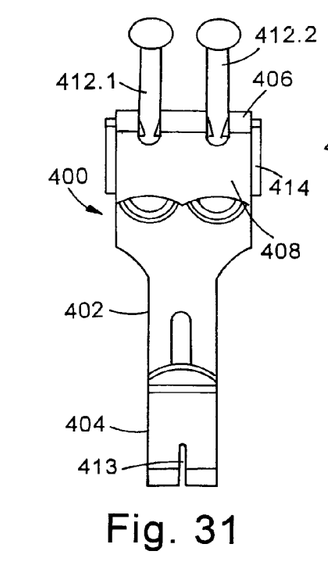
FIG. 31 is a front view of the hanger illustrated in FIG. 29.
Figures 32, 33:
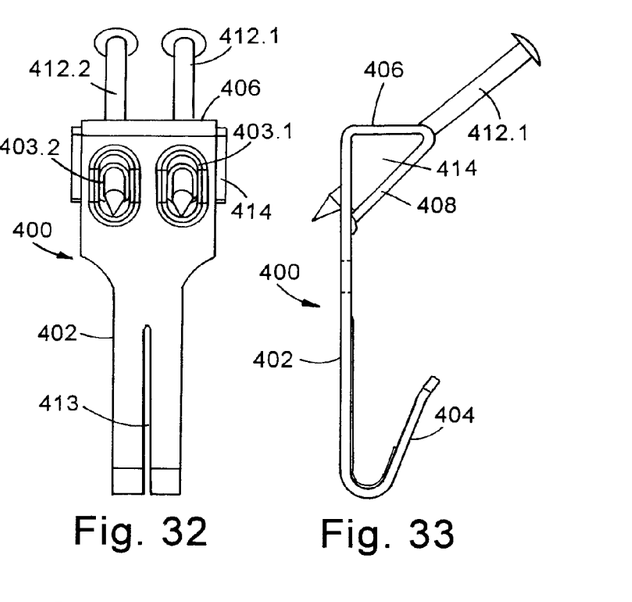
FIG. 32 is a back view of the hanger illustrated in FIG. 29.
FIG. 33 is a side view of the hanger illustrated in FIG. 29.

In use, end portions 14 and 16 are located in slots 48 of end cap members 40 and 42 so that the interior elongated and arcuate edges of slots 48 contact the corresponding elongated and arcuate walls of end portions 14 and 16 and the upper and lower faces of the slots contact the corresponding exterior faces of end portions 14 and 16. As a result, there is a strong frictional force between end portions 14 and 16 and the interior surfaces of slots 48 of end cap members 40 and 42, to prevent significant relative movement between end cap members 40 and 42 and base 12 while nails 36 and 38 are being hammered into frame 25, as illustrated in FIG. 11.

End cap members 40 and 42 respectively include through holes 60 and 62, respectively aligned with nailholes 32 and 34. Shafts 37 of nails 36 and 38 are located in through holes 60 and 62 so the pointed ends 41 of the nails extend below the lower faces 55 of end cap members 40 and 42, while the heads 39 of the nails extend above the upper faces 57 of end cap members 40 and 42, with the peripheries of shafts 37 of nails 36 and 38 contacting the walls of the through holes, to provide a tight frictional fit between the walls of the nail shafts and the walls of the through holes.

In one arrangement wherein end cap members 40 and 42 are injection molded about end portions 14 and 16 while nails 36 and 38 are in nailholes 32 and 34, each of through holes 60 and 62 has the same circular diameter throughout its length, equal to the circular diameter of the shafts of nails 36 and 38, respectively. Alternatively, end cap members 40 and 42 are injection molded about end portions 14 and 16, without nails 36 and 38 in nailholes 32 and 34 and the nails are inserted into the nailholes and the through holes after the injection molding operation.

In situ injection molding of end cap members 40 and 42 about end portions 14 and 16 enables (1) slot 48 to have interior dimensions and a shape identical to the exterior dimensions and shape of end portions 14 and 16, and (2) through holes 60 and 62 to have interior dimensions and a shape identical to the exterior dimensions and shape of the exterior of the portions of shafts 37 of nails 36 and 38 that are in the mold during the injection molding process.

As a further alternative, end cap members 40 and 42 can be injection molded separately from base 10 and forced onto end portions 14 and 16 and held in place only by friction or by an appropriate adhesive or a combination of friction and adhesive.

Figures 1, 2, 4:
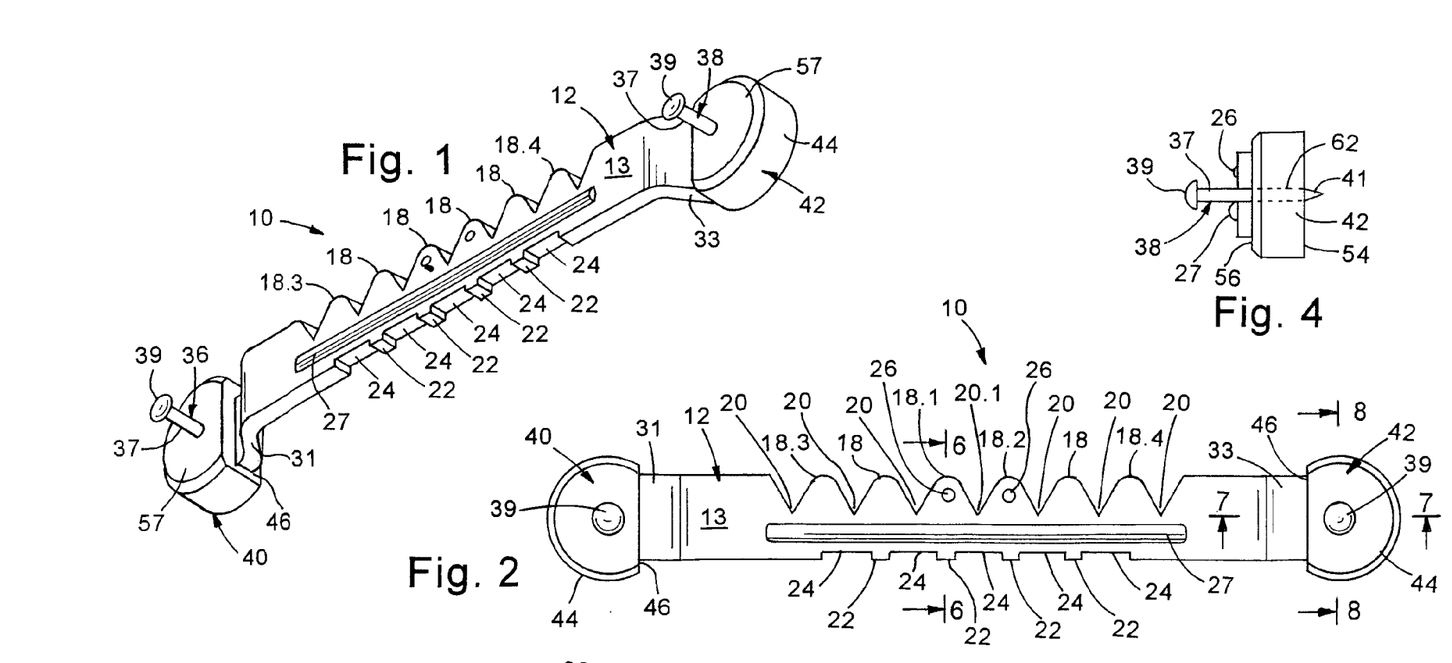
FIG. 1 is a perspective view of a picture hanger of the type adapted to be secured by nails to a picture frame in accordance with a first preferred embodiment of the present invention.
FIG. 2 is a front view of the picture hanger illustrated in FIG. 1.
FIG. 4 is an end view of the picture hanger illustrated in FIG. 1.
Figure 3:
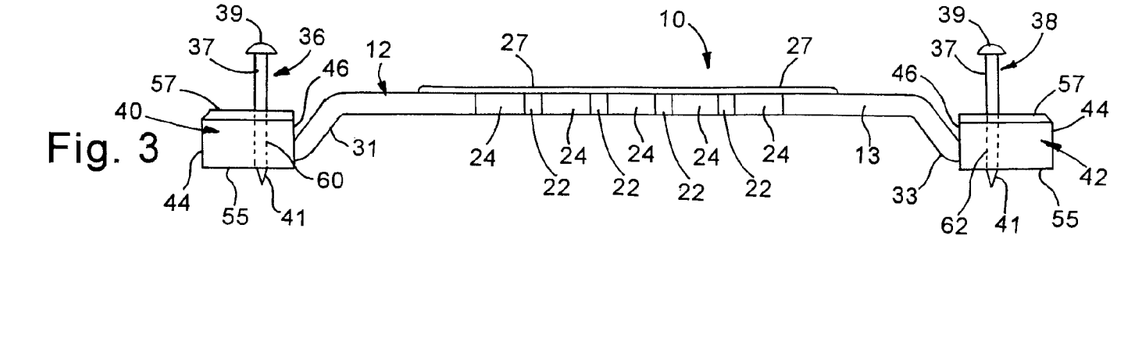
FIG. 3 is a side view of the picture hanger illustrated in FIG. 1.
Figures 5, 6, 7, 8:
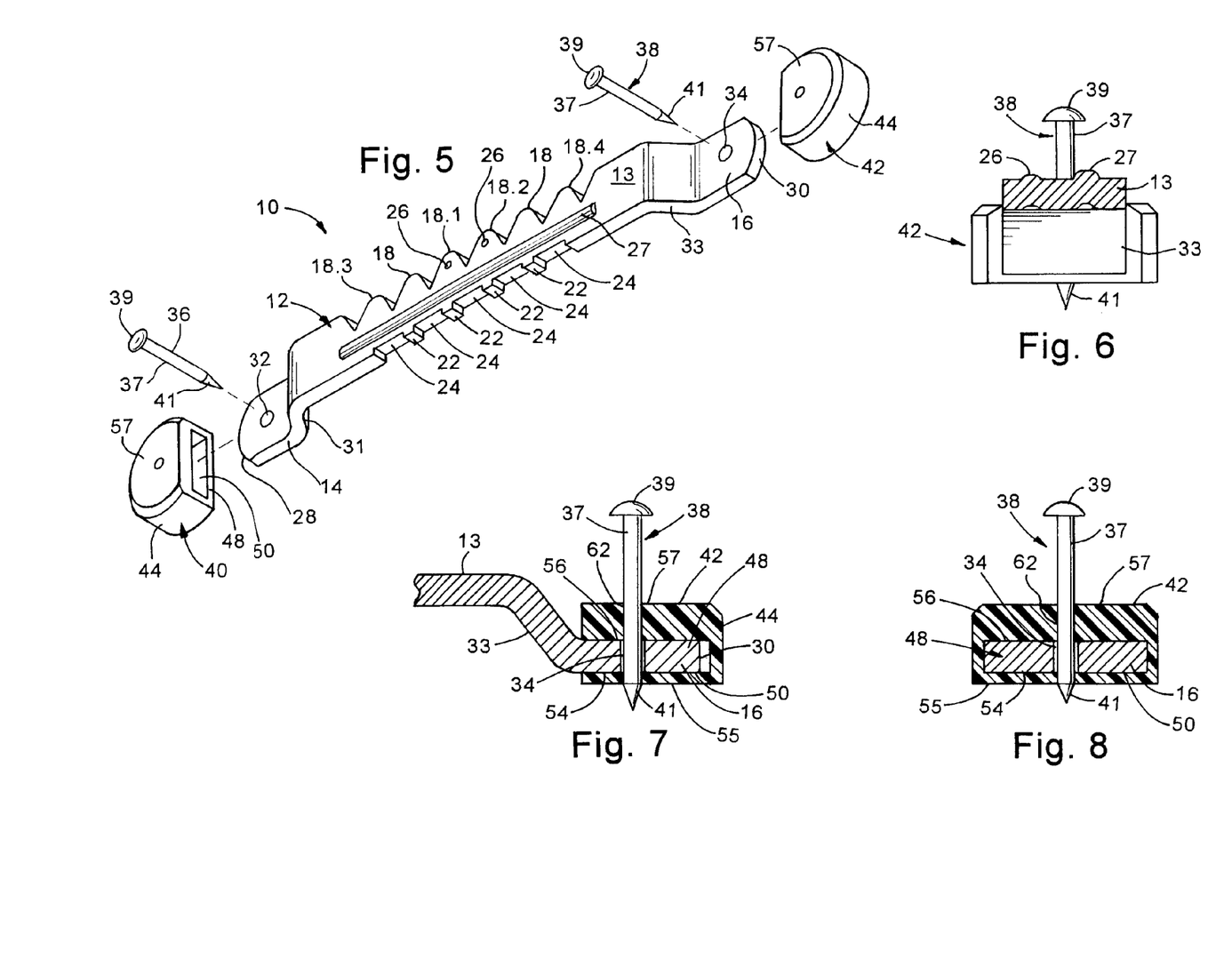
FIG. 5 is an exploded perspective view of the picture hanger illustrated in FIG. 1.
FIG. 6 is a sectional view taken through the lines 6-6, FIG. 2.
FIG. 7 is a sectional view taken through the lines 7-7, FIG. 2.
FIG. 8 is a sectional view taken through the lines 8-8, FIG. 2.
Figure 9:
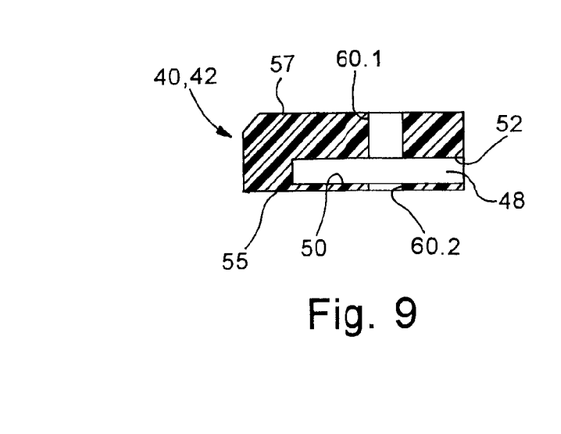
FIG. 9 is a sectional view of one embodiment of an end cap member of the hanger of FIG. 1 prior to installation of a nail.
Figure 10:
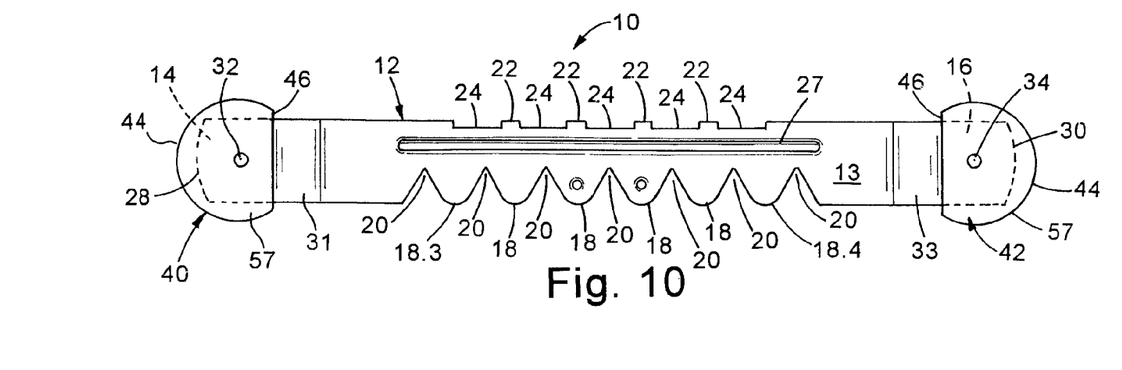
FIG. 10 is a back view of the picture hanger illustrated in FIG. 1, with the ends of the elongated body of the hanger illustrated in phantom, and the hanger illustrated in an upside down position relative to the position illustrated in FIGS. 1 and 2.

In a further alternate arrangement, illustrated in FIG. 9, end cap members 40 and 42 are injection molded onto end portions 14 and 16 without nails 36 and 38 in nailholes 32 and 34 and the nails are inserted into the nailholes after the injection molding operation. In the FIG. 9 arrangement, the diameter of the upper portion 60.1 of the through holes between the upper face 52 of slots 48 and the exterior upper face 57 of end cap members 40 and 42 is equal to the diameter of nail shaft 37. In contrast, the diameter of the lower portion 60.2 of the through holes between the lower face 50 of the slots and the exterior lower face 55 of the end caps is slightly less than the diameter of nail shaft 37, prior to insertion of the nails into the through holes and nailholes. It has been found that this arrangement more positively holds the nails in place during the hammering operation than a through hole arrangement having a constant diameter through hole. For an 18 gauge nail (having a 0.055" shaft diameter), the diameter of through hole portion 60.2 is 0.045", slot 48 has a height of 0.040" between its interior faces 50 and 52, and the end cap member has a thickness of 0.010" between faces 50 and 54 and a thickness of 0.120" between its exterior faces 55 and 57. This injection molding operation also enables slot 48 to have interior dimensions and a shape identical to the exterior dimensions and shape of end portions 14 and 16 to provide a secure fit that is obtained only by friction.

The spacing between the top and bottom faces 55 and 57 of end cap members 40 and 42 is typically about twice the length of the shafts of nails 36 and 38. As a result of the foregoing, there is a strong frictional force between the exterior surfaces of shafts 37 of nails 34 and 36 and the walls of through holes 60 and 62, to enable nails 34 and 36 to be held in situ in through holes 60 and 62 during a nailing operation without manual holding of the nails, as illustrated in FIG. 11.

Each of end cap members 40 and 42 consists essentially of nylon-6,6, a semicrystalline polyamide having a glass transition temperature of about 50° C., a melting temperature of about 255° C., a molecular weight of about 226 g per mole, and the chemical composition $C_{12}H_{22}O_2N_2$. Each of end cap members 40 and 42 preferably has a Shore A hardness in the range of 80-90.

The foregoing physical and chemical characteristics of end cap members 40 and 42, in combination with the injection molding process, enable the end cap members to be sufficiently flexible and have physical memory properties so the end cap members can expand and contract under the pressure associated with hammering nails 36 and 38 into picture frame 25. As a result, end cap members 40 and 42 securely hold nails 36 and 38 in place while the nails are being hammered into picture frame 25, without a need for the installer to hold the nail. These physical and chemical characteristics of end cap members 40 and 42 also enable the members to have what is believed to be a virtually indefinite shelf life.

Reference is now made to FIGS. 12-16 which are various views of small D ring hanger 100 of the type adapted to be secured by one sheet metal screw 102 to a picture frame in accordance with a second preferred embodiment of the invention. Screw 102 has a tapered threaded shaft 104 with a pointed end 106 opposite from pan head 108 having a flat lower surface 110 and a rounded upper surface 112 including notch 114 for receiving an appropriate screwdriver. Pointed end 106 is driven by the screwdriver into the rear of a picture frame to be hung on a wall. For the reasons discussed infra, screw 102 can be driven by the screwdriver into the rear of the picture frame without the installer holding the screw.

Hanger 100 includes a base in the form of strap 116 having two vertically extending arms 118 attached to two parallel plates 117 and 119 with abutting planar faces. Plates 117 and 119 form end portion 126 that hangs from arms 118 and has essentially the same shape as end portions 14 and 16 of the hanger illustrated in FIGS. 1-11. Arms 118 are carried by shoulders 120 of small D ring 122, having an upper curved portion 124 that is held in place by an elongated fastener, either a nail or screw, secured to a wall on which the picture frame carrying hanger 100 is to be hung. Strap 116 and ring 122 are both made of steel coated by brass.

End portion 126 is enclosed by end cap member 128, which is constructed (1) of nylon-6,6 having a Shore A hardness in the range of 80-90 and (2) in substantially the same manner as end cap members 40 and 42. End cap member 128 includes slot 130 which is constructed and positioned substantially the same as slot 48. End cap member 128 is held in place on end portion 126 only by friction, as described in connection with end cap members 40 and 41 being held in place on end portions 14 and 16, or by adhesive or by a combination of friction and adhesive.

End portion 126 includes screw hole 127 with no threads, but having a diameter sufficient to receive the threaded shaft 104 of screw 102. The threads on shaft 104 of screw 102 are held in place by threads on tapered through hole 130 of plastic end cap member 128. The taper of through hole 130 matches the taper of shaft 104 of screw 102. End cap member 128 can be made by using the injection molding techniques described supra in connection with end cap members 40 and 42. The mold provides the taper and threads necessary to accommodate screwing of threaded shaft 104 into through hole 130.

The foregoing physical and chemical characteristics of end cap member 128, in combination with the injection molding process, enable end cap member 128 to be sufficiently flexible and have physical memory properties so the end cap member can expand and contract under the pressure associated with driving screw 102 into a picture frame, such as frame 25. As a result, end cap member 128 securely holds screw 102 in place while the screw is being screwed into the picture frame and there is no need for the installer to hold the screw during the screwing operation. These physical and chemical characteristics of end cap member 128 also enable member 128 to have what is believed to be a virtually indefinite shelf life.

In one preferred arrangement, hanger 100 has a total length of 1.227", D ring 122 has a width of 0.630" at its widest region, end cap member 128 has a length of 0.423" at its longest region and a thickness of 0.130", and screw 102 is an 8 gauge sheet metal screw having a shaft length of 0.5".

Reference is now made to FIGS. 17-21 which are various views of large D ring hanger 200 of the type adapted to be secured by two vertically oriented side-by-side sheet metal screws 202 and 203 to a picture frame in accordance with a third preferred embodiment of the invention. Each of screws 202 and 203 has a tapered threaded shaft 204 with a pointed end 206 opposite from pan head 208 having a flat lower surface 210 and a rounded upper surface 212 including notch 214 for receiving an appropriate screwdriver. Pointed ends 206 are driven by the screwdriver into the rear of a picture frame to be hung on a wall. For the reasons discussed infra, screws 202 and 203 can be driven by the screwdriver into the rear of the picture frame without the installer holding either of the screws.

Hanger 200 includes a base in the form of strap 216 having two vertically extending arms 218 and an end portion 215 including rear plate 217 and front plate 219 with abutting planar parallel faces. Plates 217 and 219 extend downwardly from arms 218 that are carried by shoulders 220 of large D ring 222. D ring 222 has an upper curved portion 224 that is held in place by an elongated fastener, either a nail or screw, secured to a wall on which the picture frame carrying hanger 200 is to be hung. Strap 216 and ring 222 are both made of steel coated by brass.

End cap member 228, which is constructed of injection molded nylon-6,6 having a Shore A hardness in the range of 80-90, encloses the front face of end portion 215, by virtue of the end cap member including a plate 221 covering the front face of plate 219. End cap member 228 also includes segments 229 that cover portions of the side edges of plates 217 and 219 that are aligned with slight depressions (not shown) on the rear face of plate 217. End cap member 228 also includes very thin portions 232 that resemble tabs and extend into the depressions on the rear face of plate 217; the rear face of plate 217 is otherwise exposed. The exposed portion of the rear face of plate 217 and the exposed faces of tab like portions 232 are coplanar so that the rear face of plate 217 can abut smoothly against the frame on which hanger 200 is mounted.

End portion 226 includes vertically displaced, aligned threadless screw holes 227.1 and 227.2, each having the same diameter, which is sufficient to receive the threaded shafts 204 of screws 202 and 203. The threads on shafts 204 of screws 202 and 203 are held in place by threads on tapered through holes 230.1 and 230.2 of plastic end cap member 228. The tapers of through holes 230.1 and 230.2 match the tapers of shafts 204 of screws 202 and 203.

End cap member 228 is preferably injection molded on strap 216, without screws 202 and 203 in screw holes 227.1 or 227.2 of the strap. End cap member 228 is typically held in place on end portion 226 only by friction resulting from the contact of (1) plate 221 of end cap member 228 covering the front face of plate 219 of strap 216, (2) segments 229 covering portions of the side edges of plates 217 and 219, and (3) very thin, tab like portions 232 of the end cap member extending into the depressions on the rear face of plate 217. If necessary, end cap member 228 can also be secured to end portion by applying adhesive to the abutting faces of plates 219 and 221.

The foregoing physical and chemical characteristics of end cap member 228, in combination with the injection molding process, enable the end cap member 228 to be sufficiently flexible and have physical memory properties so the end cap member can expand and contract under the pressure associated with driving screws 202 and 203 into a picture frame, such as frame 25. As a result, end cap member 228 securely holds screws 202 and 203 in place while the screws are being screwed into the picture frame and there is no need for the installer to hold the screws during the screwing operation. These physical and chemical characteristics of end cap member 228 also enable member 228 to have what is believed to be a virtually indefinite shelf life.

In one preferred arrangement, hanger 200 has a total length of 2.258", D ring 222 has a width of 0.914" at its widest region and a length of 1.018" at its longest region, end cap member 228 has a length of 1.125" at its longest region and a thickness of 0.160", and each of screws 202 and 203 is a 6 gauge sheet metal screw having a shaft length of 0.5".

Reference is now made to FIGS. 23-28, which are various views of picture hanger 300 of the type that is secured to a wall and includes base 302 having nailhole 303 toward the top thereof. Hook 304, for receiving a thin elongated structure, such as a metal wire, fixedly attached to a frame to be hung on hanger 300, extends upwardly and outwardly from the bottom of base 302. Horizontal stub 306 extends from the top of base 302. At the end of stub 306 remote from base 302 is diagonal strut 308 that extends horizontally and vertically toward and ends at base 302, slightly below nailhole 303. Nailhole 310, at the intersection of stub 306 and strut 308, is aligned with nailhole 303. Nail 312 passes through nailholes 303 and 310. In one arrangement, base 302, hook 304, stub 306 and strut 308 are formed from a unitary stamped zinc plated 18 gauge sheet steel structure having a thickness of 0.050" and a constant width between its edges, while nail 312 is a half-inch long 18 gauge nail having a shaft diameter of 0.050". The bottom portions of base 302 and hook 304 include strengthening rib 313. The structure of hanger 300 described to this point is conventional.

To enable nail 312 to be hammered into place without the installer manually holding the nail, member 314, made of nylon-6,6 having a Shore A hardness in the range of 80-90, fills the triangular volume between stub 306, strut 308 and the portion of base 302 between the (1) intersection of the strut and base and (2) the intersection of the base and stub. Member 314 includes through hole 316 that is aligned with nailholes 303 and 310. The shaft of nail 312 is fractionally held in place by the walls of through hole 316 in such a manner that the nail need not be manually held while a hammer held by the installer is applying driving force to the nail to cause the nail to be driven in holes 303, 310 and 316 and into the wall.

Member 314 is injection molded into the triangular volume, either with nail 312 in nailholes 303 and 310, or without the nail in the nailholes. In the latter situation, through hole 316 is formed during the molding process and has a constant diameter equal to the diameter of the shaft of nail 312. Alternatively, through hole 316 is tapered so that the diameter of the end thereof next to nailhole 303 is slightly smaller than the diameter of the end thereof next to nailhole 310. As a further alternative, member 314 is injection molded separately from the metal part of the hanger and then inserted into the triangular volume, where the member is held in place only by friction or by an appropriate adhesive or a combination of friction and adhesive.

Member 314 extends slightly beyond the opposite vertically extending edges of base 302, stub 306 and strut 308 for added strength.

From the foregoing, a portion of base 302 carries member 314 that encloses the front face of the base.

The physical and chemical characteristics of member 314, in combination with the injection molding process, enable member 314 to be sufficiently flexible and have physical memory properties so member 314 can expand and contract under the pressure associated with hammering nail 312 into a wall. As a result, member 314 securely holds nail 314 in place while the nail is being hammered into the wall, without a need for the installer to hold the nail. The physical and chemical characteristics of member 314 also enable member 314 to have what is believed to be a virtually indefinite shelf life.

Reference is now made to FIGS. 29-34, which are various views of picture hanger 400 of the type that is secured to a wall and includes base 402 having side-by-side nailholes 403.1 and 403.2 toward the top thereof. Hook 404, for receiving a thin elongated structure, such as a metal wire, fixedly attached to a frame to be hung on hanger 400, extends upwardly and outwardly from the bottom of base 402. Horizontal stub 406 extends from the top of base 402. At the end of stub 406 remote from base 402 is diagonal strut 408 that extends horizontally and vertically toward and ends at base 402 slightly below nailholes 403.1, 403.2. Side-by-side nailholes 410.1 and 410.2, at the intersection of stub 406 and strut 408, are respectively aligned with nailholes 403.1 and 403.2. Nails 412.1 and 412.2 respectively pass through nailholes 403.1, 403.2 and 410.1, 410.2. In one arrangement, base 402, hook 404, stub 406 and strut 408 are formed from a unitary stamped zinc plated 18 gauge sheet steel structure having a thickness of 0.050" and nail 312 is a half-inch long 18 gauge nail having a shaft diameter of 0.050". The bottom portions of base 402 and hook 404 include strengthening rib 413. To accommodate nails 412.1 and 412.2, upper portion of base 402, stub 406 and strut 408 are wider between the edges thereof than the lower part of base 402 and hook 404. The structure of hanger 400 described to this point is conventional.

To enable nails 412.1 and 412.2 to be hammered into place without the installer manually holding the nails, member 414, made of nylon-6,6 having a Shore A hardness in the range of 80-90, fills the triangular volume between stub 406, strut 408 and the portion of base 402 between the (1) intersection of the strut and base and (2) the intersection of the base and stub. Member 414 includes through holes 416.1 and 416.2 that are respectively aligned with nailholes 403.1 and 410.1 in the first instance and with nailholes 403.2 and 410.2 in the second instance. The shafts of nails 412.1, 412.2 are respectively frictionally held in place by the walls of through holes 416.1 and 416.2 in such a manner that the nails need not be manually held while a hammer held by the installer is applying driving force to the nails to cause the nails to be driven in holes 403.1, 410.1 and 416.1 in the first instance and holes 403.2, 410.2 and 416.2 in the second instance and into the wall.

Member 414 is preferably injection molded into the triangular volume, either with nails 412.1 and 412.2 in nailholes 403.1, 403.2 and 410.1, 410.2, or without the nails in the nailholes. In the latter situation, through holes 416.1, 416.2 are formed during the molding process and have a constant diameter equal to the diameter of the shafts of nails 412.1, 412.2. Alternatively, through holes 416.1, 416.2 are tapered so that the diameters of the end thereof next to nailholes 403.1, 403.2 are slightly smaller than the diameters of the ends thereof next to nailholes 410.1, 410.2. As a further alternative, member 414 is injection molded separately from the metal part of the hanger and then inserted into the triangular volume, where the member is held in place only by friction or by an appropriate adhesive.

Member 414 extends slightly beyond the opposite vertically extending edges of base 402, stub 406 and strut 408 for added strength.

From the foregoing, a portion of base 402 carries member 414 that encloses the front face of the base.

The physical and chemical characteristics of member 414, in combination with the injection molding process, enable member 414 to be sufficiently flexible and have physical memory properties so member 414 can expand and contract under the pressure associated with hammering nail 412 into a wall. As a result, member 414 securely holds nails 412.1, 412.2 in place while the nails are being hammered into the wall, without a need for the installer to hold the nails. The physical and chemical characteristics of member 414 also enable member 414 to have what is believed to be a virtually indefinite shelf life.

While there have been described and illustrated several specific embodiments of the invention, it will be clear that variations in the details of the embodiments specifically illustrated and described can be made without departing from the true spirit and scope of the invention, as defined in the appended claims.

The invention claimed is:

1. A picture hanger for mounting an object on a vertical surface, the picture hanger being adapted to be mounted on the vertical surface in a first case, the picture hanger being adapted to be mounted on the object in a second case, the picture hanger comprising a base, the base having (a) a front face adapted to face away from the object, (b) a rear face opposite from the front face adapted to face toward the object, and (c) a portion with a fastener hole between the front and rear faces for receiving an elongated fastener; and the base portion carrying a member enclosing the base portion on at least three sides, the member including a flat front face having a slot therein configured to receive the base portion, and a through hole aligned with the fastener hole; wherein the fastener hole and the through hole are configured in such a manner that the fastener need not be manually held while a driving force is applied to the fastener to cause the fastener to be driven in the holes and into the vertical surface in the first case and into the object in the second case.

2. The picture hanger of claim 1 wherein: the fastener is a nail having a shaft with a pointed end, the member encloses the rear face of the base, prior to the picture hanger being mounted, so the through hole and the shaft of the nail are on both sides of the fastener hole, the fastener hole and the through hole are holes for the nail shaft, and the pointed end of the shaft extends beyond the rear face of the base.

3. The picture hanger of claim 2 wherein, (a) a portion of the through hole between the front face and the base has a constant circular circumference substantially equal to the circumference of the elongated fastener, and (b) a portion of the through hole between the back face and the base has a constant circular circumference less than the circumference of the elongated fastener.

4. The picture hanger of claim 1 wherein: the fastener is a nail having a pointed end extending beyond the rear face of the base, and the member has a hardness and flexibility such that the member does not crack in response to the nail being struck by a hammer applying driving force to the nail while the nail is in the fastener hole and the through hole and the pointed end is being driven by hammering of the nail into the vertical surface in the first case or into the object in the second case.

5. The picture hanger of claim 1 wherein: the fastener is a screw having a tapered threaded shaft with a pointed end, the member encloses the rear face of the base so the through hole and the shaft of the screw are on both sides of the fastener hole, the fastener hole and the through hole are holes for the screw, and the pointed end of the shaft extends beyond the rear face of the base.

6. The picture hanger of claim 1 wherein: the fastener is a screw having a tapered threaded shaft with a pointed end extending beyond the rear face of the base, the member has a hardness and flexibility such that the member does not crack in response to the screw being turned by a screwdriver applying driving force to the screw while the screw is in the fastener hole and the through hole and is being driven into the object by turning of the screw by the screwdriver.

7. The picture hanger of claim 1 wherein the member consists essentially of a semicrystalline polyamide having a glass transition temperature of about 50° C., a melting temperature of about 255° C. and a molecular weight of about 226 g per mole.

8. The picture hanger of claim 7 wherein the member consists essentially of $C_{12}H_{22}O_2N_2$ and has approximately a Shore A hardness in the range of 80-90.

9. The picture hanger of claim 1 wherein the member is injection molded in situ on the base portion while the fastener is in the fastener hole.

10. In the method of making the picture hanger of claim 9 wherein the member is injection molded in situ on the portion of the base prior to the fastener being in the fastener hole and the fastener is inserted into the fastener hole after the member has been injected molded to the base portion.

11. The picture hanger of claim 7 wherein the member has approximately a Shore A hardness in the range of 80-90.

12. The picture hanger of claim 7 wherein the member consists essentially of $C_{12}H_{22}O_2N_2$.

13. The picture hanger of claim 1 wherein: the member, prior to the hanger being mounted, is held in place on the base portion by friction between surfaces on the interior of a slot in the member and surfaces on the base portion, and the base portion fits into the slot so the front and back faces of the member respectively abut top and bottom faces of the slot.

14. The hanger of claim 13 wherein the faces of the slot are such that, when the hanger is mounted on the object, in the second case, the member has greater thickness between (a) the top face of the slot and an exterior face of the member remote from a pointed end of the fastener that is driven into the object, than between (b) the bottom face of the slot and an exterior face of the member proximate the pointed end of the fastener that is driven into the object.

15. The picture hanger of claim 1 wherein the picture hanger includes a plurality of said portions, a member enclosing a front face of each of said portions so that there is a through hole associated with the fastener hole in each portion, and one of said fasteners being held in place in each of said through holes.

16. In a method of making the picture hanger of claim 1 comprising the step of injection molding the member on the portion of the base.

17. The method of claim 16 wherein the member is injection molded in situ on the base portion while the fastener is in the fastener hole.

18. The method of claim 16 wherein the member is injection molded in situ on the portion of the base prior to the fastener being in the fastener hole and the fastener is inserted into the fastener hole after the member has been injected molded to the base portion.

19. The method of claim 16 wherein the member consists essentially of a semicrystalline polyamide having a glass transition temperature of about 50° C., a melting temperature of about 255° C. and a molecular weight of about 226 g per mole.

20. The method of claim 16 wherein the member has approximately a Shore A hardness in the range of 80-90.

21. The method of claim 16 wherein the member consists essentially of $C_{12}H_{22}O_2N_2$.

22. The method of claim 16 wherein the member consists essentially of semicrystalline polyamide $C_{12}H_{22}O_2N_2$ having a Shore A hardness in the range of 80-90.

23. The picture hanger of claim 1 wherein the hanger is adapted to be mounted on the object, for use in the second case, and the hanger includes a surface adapted to rest on an elongated fastener secured to the vertical surface.

24. The picture hanger of claim 1 wherein the hanger is adapted to be mounted on the vertical surface, for use in the first case, and the hanger includes a surface adapted to carry a thin elongated structure secured to the vertical surface.

* * * * *